United States Patent
Tardif et al.

[11] Patent Number: 5,897,067
[45] Date of Patent: Apr. 27, 1999

[54] SPICE/PEPPER-MILL ADJUSTMENT MECHANISM

[75] Inventors: Pierre Tardif, Longueuil; Jean-Francois Tellier, Montreal, both of Canada

[73] Assignee: Genin, Trudeau & Cie Ltee, Quebec, Canada

[21] Appl. No.: 08/842,511

[22] Filed: Apr. 24, 1997

[51] Int. Cl.[6] .................................................. A47J 42/08
[52] U.S. Cl. ......................................................... 241/169.1
[58] Field of Search .............................. 222/142.1–142.7; 241/169.1, 259.1, 168

[56] References Cited

U.S. PATENT DOCUMENTS

| | | | |
|---|---|---|---|
| 3,136,491 | 6/1964 | Posmanter | 241/169.1 |
| 4,509,698 | 4/1985 | David | 241/169.1 |
| 4,591,104 | 5/1986 | Bounds | 241/169.1 |
| 5,145,119 | 9/1992 | Lowe | 241/169.1 |
| 5,176,329 | 1/1993 | DeCoster et al. | 241/169.1 |

FOREIGN PATENT DOCUMENTS

| | | |
|---|---|---|
| 331539 | 9/1919 | Germany. |
| 548553 | 3/1932 | Germany. |
| 597539 | 5/1934 | Germany. |

*Primary Examiner*—Mark Rosenbaum
*Attorney, Agent, or Firm*—Fish & Richardson PC

[57] ABSTRACT

Disclosed herein is a unique adjustable spice/pepper-mill. The spice/pepper-mill is equipped with a shifter mechanism which can be placed in three different positions. The shifter is located at the bottom of the spice/pepper-mill. The three positions of the shifter translate into the production of fine, medium and coarse ground spices/pepper. The different settings for grind size are found by rotating a tapered step ring which applies upward pressure on a male grinding mill forcing it upwardly into a female grinding mill. The higher the male grinding mill is located, the smaller the ground spice/pepper size produced.

10 Claims, 6 Drawing Sheets

SPICE/PEPPER-MILL ADJUSTMENT MECHANISM

This invention relates to spice or pepper grinding mills and more particularly relates to adjustable spice/pepper grinding mills.

BACKGROUND

Spice and pepper grinding mills for the consumer have been in existence for many years. Freshly ground spices, and in particular pepper, have much better flavour than previously ground spices. Generally, spice/pepper-mills have been comprised of a body and top or cap portion which rotates in a clockwise direction to rotate the male grinding mill within the stationary female grinding mill, to produce the ground spice product.

In the prior art mills, generally a top cap which is threaded onto a shaft, is used to either loosen or tighten the abutting relationship of the male and female grinder mills. Unfortunately, this type of adjustment with the cap is not accurate. Furthermore, the cap, vis a vis the top portion of the grinder, changes position because of rotation. Uneven sizing of the ground product is the result. Furthermore, the threaded cap must be constantly moved back into the desired position as it tends to either tighten or loosen, depending upon the movement given to the spice mill.

It is, therefore, an object of the present invention to provide an adjustable spice/pepper-mill which will produce ground spice of three particulate sizes, constantly and accurately, whenever desired.

Therefore, this invention seeks to provide an adjustable spice grinding device for domestic use; said device being adapted to dispense ground spice of varying particulate size; said device including a shift means, an outer grinding mill and an inner grinding mill; said inner grinding mill being disposed on a vertical shaft and rotatable therewith; said shift means being adapted in operation to move said inner grinding mill vertically on said shaft such that a distance between an inner grinding surface of said outer grinding mill and an outer grinding surface of said inner grinding mill varies, thereby producing, in operation, ground spice of different particulate size.

The invention further seeks to provide a spice grinding device wherein a shift means comprises a rotatable shifter, a bridge and a movable middle spacer means of unequal thickness; said spacer means being in constant contact with a lower surface of an inner grinding mill and an upper surface of said bridge whereby, in operation, said rotatable shifter is adapted to move said spacer means from a lesser thickness to a greater thickness, and vice versa, thereby moving said inner grinding mill vertically on said shaft.

The spice/pepper-mill of the present invention has a body portion and a head portion. The body portion and head portion contain a cylindrical empty middle portion which is used to store the spice to be ground. A shaft extends from the top of the head portion to the floor of a bridge. A cap secures the cylindrical shaft at the top. The shaft goes through a spring and an outer female grinding mill to an inner male grinding mill, through a step ring, to rest at the bottom of a bridge. A shifter at the bottom of the spice mill communicates with the tapered step ring such that when the shifter is moved the tapered step ring moves, and such movement causes the inner male grinding mill to move vertically upon the shaft, upwards or downwards, thus forcing it into closer or farther contact with the outer female grinding mill. Thus, the shifter will adjust the size of the product which will be ground by the spice/pepper-mill.

A spring abuts a clamp at its top end which is fixed on the shaft and it abuts the inner male grinding mill at its bottom end, thus forcing it in constant contact with the step ring. The bridge is generally secured to the outer female grinding mill and the body portion of the spice mill by screws. Thus, the bridge, the outer female grinding mill and the body portion are stationary whereas the head, the shaft and the inner male grinding mill are rotatable.

The step ring, by means of rods, is attached to the shifter such that a rotation of the shifter causes a rotation of the step ring. The bottom of the step ring in its various positions abuts projections protruding from the bottom of the bridge in such a manner that the step ring raises and lowers about the vertical shaft, thus raising or lowering the inner male grinding mill. A spacer is located between the head portion and the body portion. A plastic ring, which serves only a decorative function, is located between the head and the body. In operation, the shifter is moved to one of three positions by the user, and the head is turned in a clock-wise direction to produce ground spice.

By moving the shifter from the first position to the second position, and from the second position to the third position, the size of the ground spice will vary from fine, to medium, to coarse.

To refill the spice/pepper-mill the top threaded cap is simply removed, the head removed, and spice is poured into the cylindrical body cavity.

The invention will be described in greater detail in connection with the following drawings, wherein.

DETAILED DESCRIPTION OF THE DRAWINGS

Figure 1:
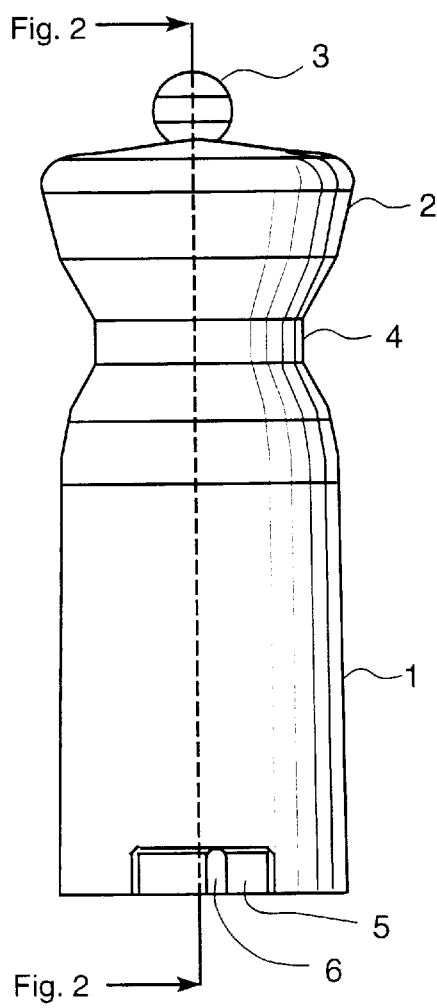
FIG. 1 is a front view of the spice-pepper-mill of the present invention.

In FIG. 1, the spice/pepper-mill of the present invention, comprises a lower body 1, a rotatable head portion 2, a cap 3, and a decorative mid ring 4. At the lower portion of the body there is an aperture 5 which permits a shifter lever 6 to extend therethrough.

Figure 2:
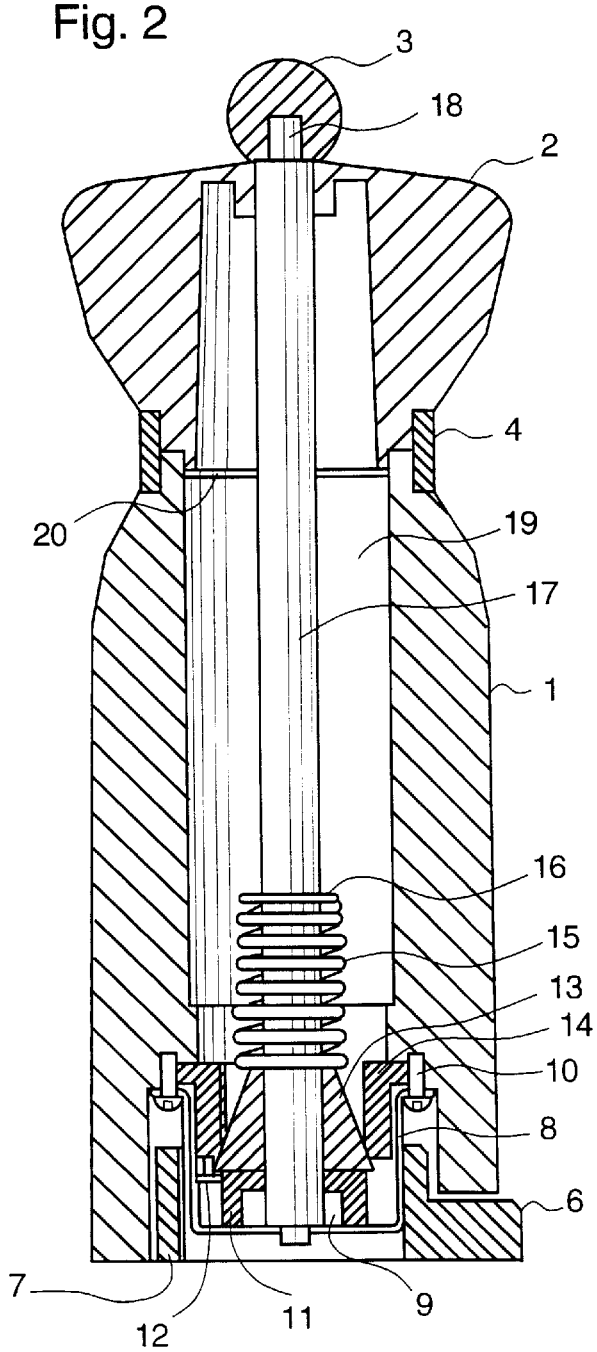
FIG. 2 is a longitudinal cross section, taken along the line II,II of FIG. 1.
Figure 3:
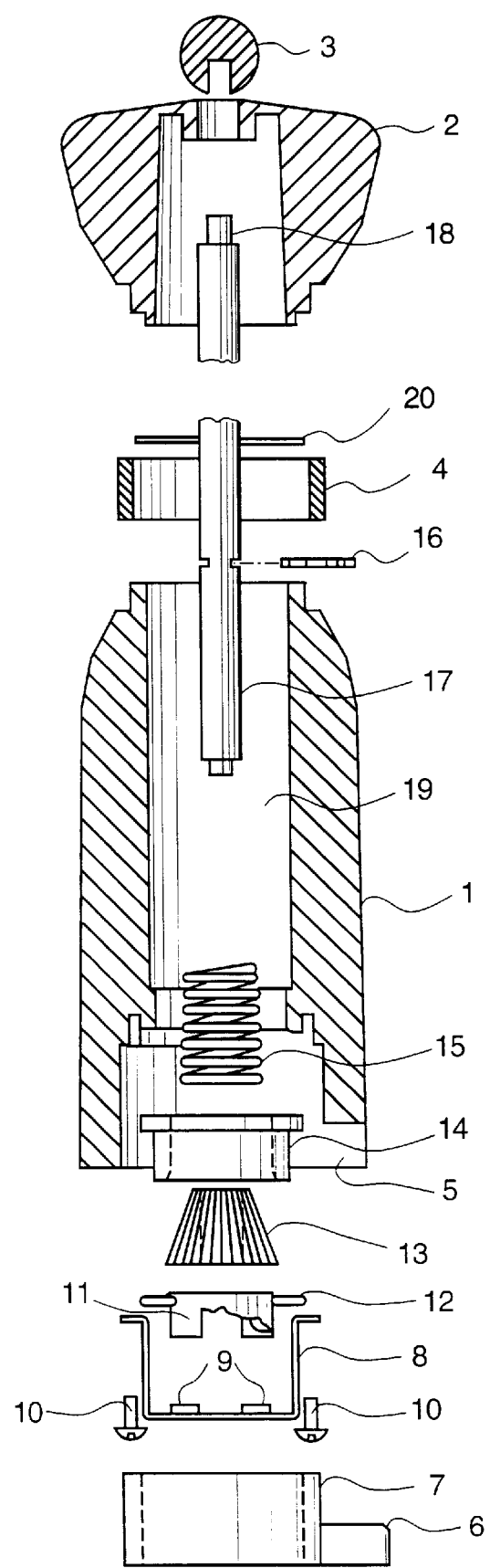
FIG. 3 is an exploded view of the components of the spice/pepper-mill.

FIG. 2 is a longitudinal cross section of FIG. 1, and FIG. 3 is an exploded view of the components of the invention.

In FIGS. 2 and 3, one notes that the shifter lever 6 is connected to the shifter body 7. The shifter is located at the bottom of the lower body 1 of the spice/pepper-mill and surrounds a bridge 8. The bridge 8 is secured to the body 1 of the spice/pepper-mill by means of screws 10, or some similar fastening mechanism. A movable middle spacer means such as a step ring 11 is in direct contact with protrusions 9 located on the floor of the bridge 8. The step ring 11 has a tapered underside and the step ring is rotatable with the shifter body 7 by means of step ring rods or arms 12 which are in contact with the shifter body 7.

Above the step ring and in direct contact therewith is an inner male grinding mill 13 which is located within an outer female grinding mill 14. The bridge 8, body portion 1 and an outer female grinding mill 14, are stationary during operation, whereas the inner male grinding mill 13 turns with the rotation of the head portion 2 and a vertical shaft 17. A spring 15F which is biased against a C-clamp 16, exerts constant pressure on the inner male grinding mill 13, maintaining it in contact with the top of step ring 11. A cavity 19, which contains the spice to be ground, is in the form of a hollow cylinder and is found within the body 1. The shaft 17, passes through the cavity 19. The top portion 18 of the shaft 17 is threaded to receive and matingly engage cap 3. The cap 3 is removed only for the purposes of cleaning or refilling the spice/pepper-mill cavity 19. It is not used to vary the size of the finished product. A nylon spacer 20 is located between the body 1 and the head 2.

Figure 4:
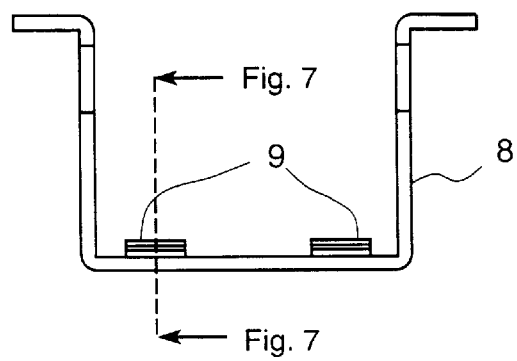
FIG. 4 is a side view of the bridge.

FIG. 4 is a side view of the bridge 8, showing the projections 9.

Figure 5:
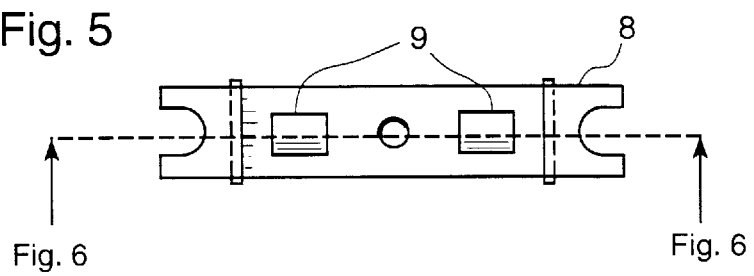
FIG. 5 is a top view of the bridge.

FIG. 5 is a top view of the bridge 8.

Figure 6:
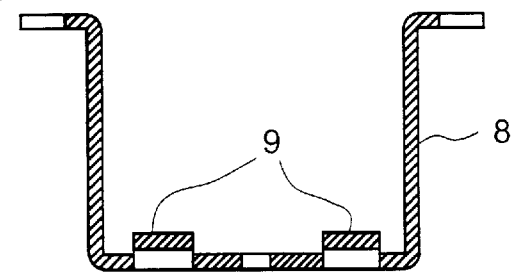
FIG. 6 is a cross section of the bridge shown as lines VI,VI of FIG. 5.
Figure 7:
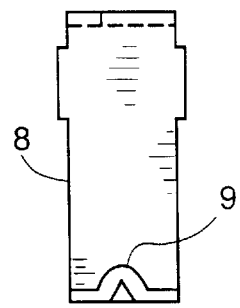
FIG. 7 is a is a view of the bridge taken along the line VII,VII of FIG. 4.

FIG. 6 is a cross section VI,VI through FIG. 5.

Figure 8:
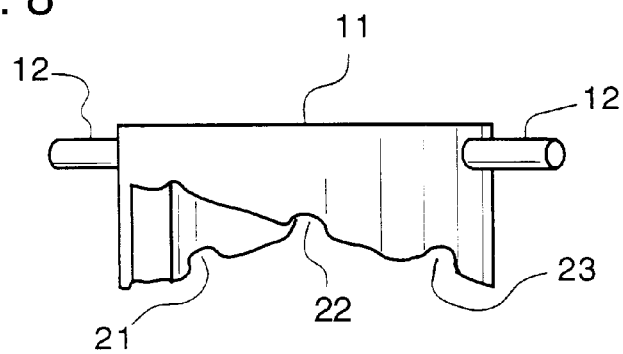
FIG. 8 is a side view of the split ring.

FIG. 8 is a detailed look at the step ring 11. One notes that there is a series of a notches 21, 22, and 23, which are adapted to engage protrusions 9. Three settings are possible, i.e. fine, medium or coarse grind. Thus, notches 21, 22 and 23 will determine the proximity of the inner male grinding mill 17 to the outer female grinding mill 14.

Figure 9:
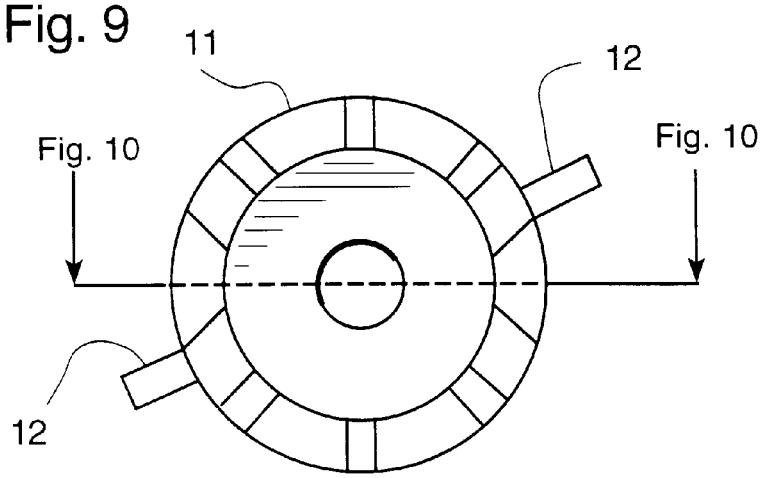
FIG. 9 is a bottom view of the split ring.

FIG. 9 is a bottom view of the tapered step ring 11.

Figure 10:
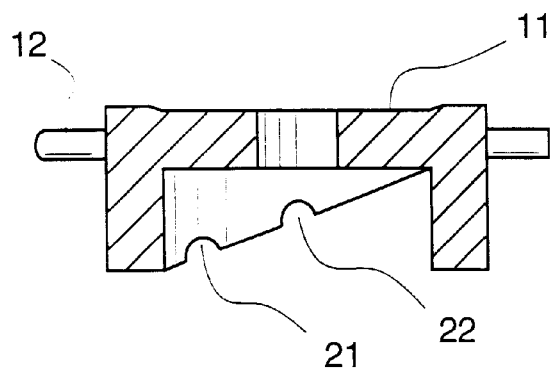
FIG. 10 is a cross section of FIG. 9 taken along the line X,X of FIG. 9.

FIG. 10 is a cross section through the lines 10,10 of FIG. 9.

In operation, the cap 3 is unscrewed and the head portion 2 is removed from the shaft. Thereafter the cavity 19 is filled with spice or pepper to be ground. Thereafter, the cap 3 is returned to the top threaded portion 18 of the shaft 17, and is snugly tightened.

Figure 11:
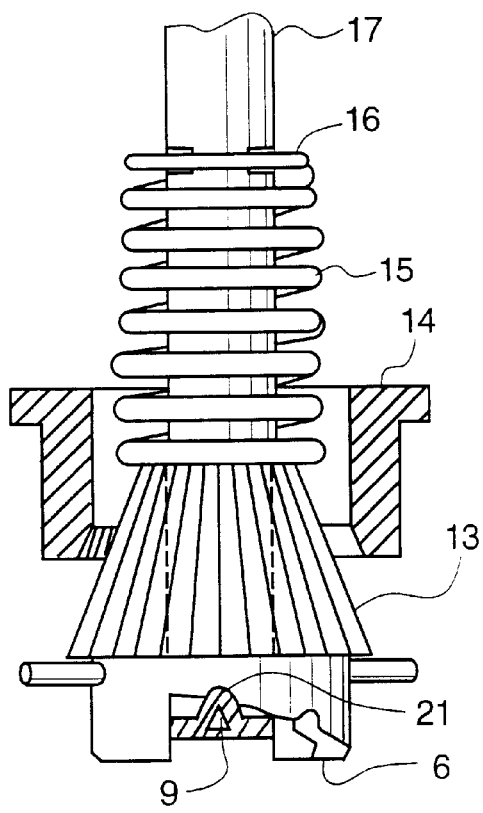
FIG. 11 is an expanded view of the split ring and the inner male grinding mill in the coarse particulate producing position.
Figure 13:
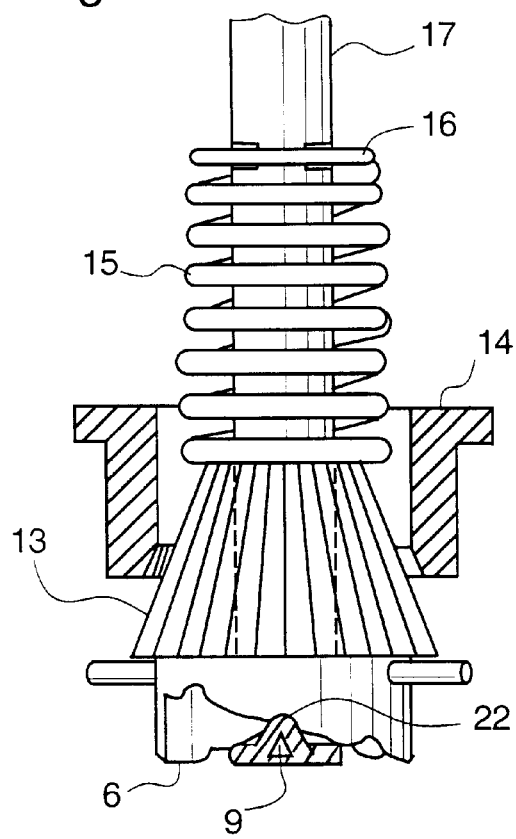
FIG. 13 is a view of the split ring and the inner male grinding mill in the medium particulate producing position.
Figure 15:
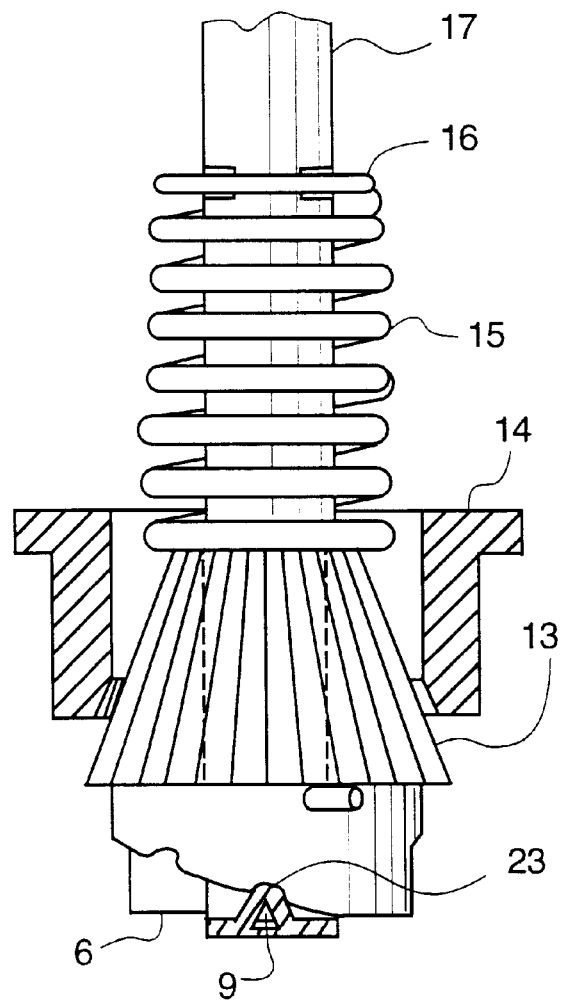
FIG. 15 is a view of the split ring and the inner male grinding mill in the fine particulate producing position.

In order to choose a ground particulate size, the shifter lever 6 is moved to one of three positions, as shown in FIGS. 11, 13 and 15.

One notes in FIG. 11 that an adjustment for coarse pepper has been selected such that the inner male grinding mill 13 is distanced considerably from the sides of the outer female grinding mill 14.

In FIG. 13, the shifter lever 6 has been moved and as a consequence the inner male grinding mill 13 is moved upwardly along shaft 17 by the step ring 11. The distance between the outer female grinding mill and the inner male grinding mill 13 is considerably diminished. Thus, a medium grind of particulate would be produced.

In FIG. 15, the lowermost notches 23 of the underside of step ring 11 are abutting projections 9 on the bridge 8. The inner male grinding mill 13 is moved upwardly to almost abut the sides of the outer female grinding mill 14. In this position, in operation, a production of finely ground particulate will result.

Once a grind size has been selected, one simply turns the head 2 of the spice/pepper-mill in a clockwise direction, which will result in the desired quantity and size of particulate produced.

Figure 12:
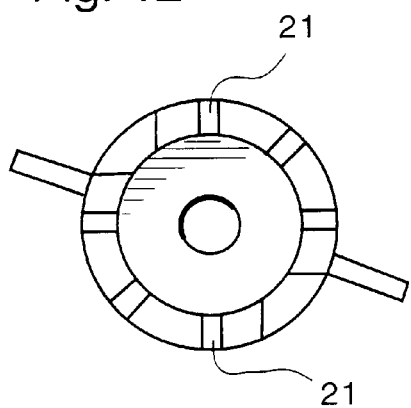
FIGS. 12, 14 and 16, respectively, are bottom views of the split ring in the coarse, medium, and fine grinding positions.
Figure 14:
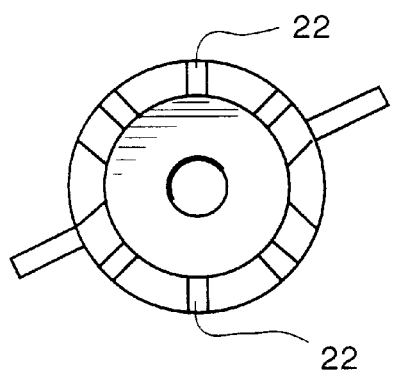
Figure 16:
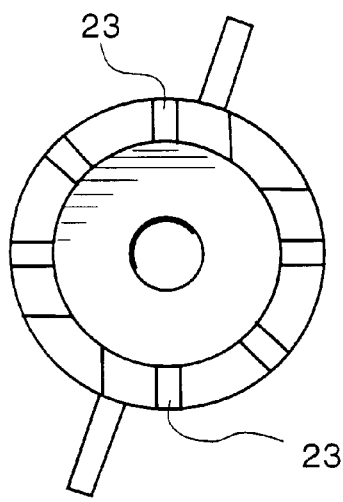

FIGS. 12, 14, and 16 show the underside of the step ring 11 in the various coarse, medium and fine settings.

Although a specific embodiment has been described in detail, it is understood that the invention of this application covers any spice/pepper-mill device where the distance between the inner male grinding mill 13 and the outer female grinding mill 14 is controlled by means of raising the inner male grinding mill 13 towards and into the outer female grinding mill 14.

What we claim as our invention is:

1. An adjustable spice grinding device for domestic use;

said device being adapted to dispense ground spice of a plurality of predetermined, fixed particulate sizes;

said device including a shift means, an outer grinding mill, and an inner grinding mill;

said inner grinding mill being disposed on a vertical shaft and rotatable therewith;

said shift means being adapted in operation to move said inner grinding mill vertically on said shaft to one of a plurality of fixed positions such that a distance between an inner grinding surface of said outer grinding mill and an outer grinding surface of said inner grinding mill can be varied according to a fixed pattern, thereby producing, in operation, ground spice of a plurality of predetermined, fixed particulate sizes, wherein said shift means comprises a rotatable shifter, a bridge and a movable middle spacer means of unequal thickness, said spacer means being in constant contact with a lower surface of said inner grinding mill and an upper surface of said bridge whereby, in operation, said rotatable shifter is adapted to move said spacer means from a lesser thickness to a greater thickness, thereby moving said inner grinding mill vertically on said shaft.

2. A device as claimed in claim 1, wherein said movable middle spacer means comprises a step ring;

said step ring including a pair of lateral arms;

said arms being adapted to engage said rotatable shifter;

said step ring including an inclined or tapered lower surface;

said lower surface including a plurality of recesses;

said recesses being adapted to engage protrusions on said bridge, whereby, in operation a rotation of said shifter and said step ring raises or lowers said inner grinding mill.

3. A device as claimed in claim 2, wherein said rotatable shifter is adapted to assume three different positions, thereby producing, in operation, particulate ground spice of coarse, medium or fine thickness.

4. A device as claimed in claim 3, including a spring disposed on said shaft between said inner grinding mill and a clamp;

said spring being adapted, in operation, to maintain said inner grinding mill in contact with an upper surface of said step ring.

5. A device as claimed in any one of claims 1, 2, 3, or 4, including a lower outer body, an upper rotatable head, a spacer, a decorative ring, and a threaded cap, said cap being affixed to said shaft when said device is in use; and said cap being removable to permit refilling a spice cavity in said body, said head being rotatable to grind said spice.

6. An adjustable spice grinding device for domestic use;

said device being adapted to dispense ground spice of varying particulate size;

said device including a shift means, an outer grinding mill, and an inner grinding mill; said inner grinding mill being disposed on a vertical shaft and rotatable therewith;

said shift means being adapted in operation to move said inner grinding mill vertically on said shaft such that a distance between an inner grinding surface of said outer grinding mill and an outer grinding surface of said inner grinding mill varies, thereby producing, in operation, ground spice of different particulate size;

wherein said shift means comprises a rotatable shifter, a bridge and a movable middle spacer means of unequal thickness, said spacer means being in constant contact with a lower surface of said inner grinding mill and an upper surface of said bridge whereby, in operation, said rotatable shifter is adapted to move said spacer means from a lesser thickness to a greater thickness, thereby moving said inner grinding mill vertically on said shaft.

7. A device as claimed in claim 6, wherein said movable middle spacer means comprises a step ring;

said step ring including a pair of lateral arms;

said arms being adapted to engage said rotatable snifter;

said step ring including an inclined or tapered lower surface;

said lower surface including a plurality of recesses;

said recesses being adapted to engage protrusions on said bridge, whereby, in operation a rotation of said shifter and said step ring raises or lowers said inner grinding mill.

8. A device as claimed in claim 7, wherein said rotatable shifter is adapted to assume three different positions, thereby producing, in operation, particulate ground spice of coarse, medium or fine thickness.

9. A device as claimed in claim 8, including a spring disposed on said shaft between said inner grinding mill and a clamp;

said spring being adapted, in operation, to maintain said inner grinding mill in contact with an upper surface of said step ring.

10. A device as claimed in any one of claims 6, 7, 8, or 9, including a lower outer body, an upper rotatable head, a spacer, a decorative ring, and a threaded cap, said cap being affixed to said shaft when said device is in use; and said cap being removable to permit refilling a spice cavity in said body; said head being rotatable to grind said spice.

* * * * *